United States Patent
Muthusamy et al.

(10) Patent No.: US 12,052,155 B2
(45) Date of Patent: Jul. 30, 2024

(54) METHODS, APPARATUSES, AND SYSTEMS FOR NETWORK ACCESSIBILITY

(71) Applicant: Comcast Cable Communications, LLC, Philadelphia, PA (US)

(72) Inventors: Saravanan Muthusamy, Wayne, PA (US); Prasad Ramanahally Siddalinga, Philadelphia, PA (US); Amarendar Sirikonda, Philadelphia, PA (US); Tim Farrell, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/081,235

(22) Filed: Dec. 14, 2022

(65) Prior Publication Data
US 2024/0205126 A1   Jun. 20, 2024

(51) Int. Cl.
*H04L 43/16*   (2022.01)
*H04W 4/021*   (2018.01)
*H04W 8/18*   (2009.01)

(52) U.S. Cl.
CPC ............ *H04L 43/16* (2013.01); *H04W 4/021* (2013.01); *H04W 8/18* (2013.01)

(58) Field of Classification Search
CPC .......... H04L 43/16; H04W 4/021; H04W 8/18
See application file for complete search history.

(56) References Cited

U.S. PATENT DOCUMENTS

| | | | |
|---|---|---|---|
| 10,135,746 B2 * | 11/2018 | Ho | H04L 45/52 |
| 10,516,990 B2 * | 12/2019 | Wane | H04B 1/3816 |
| 11,432,357 B2 | 8/2022 | Wang | |
| 11,503,025 B2 * | 11/2022 | Westerling | H04L 45/74 |

(Continued)

FOREIGN PATENT DOCUMENTS

| | | |
|---|---|---|
| WO | 2013166507 A1 | 11/2013 |
| WO | 2018206081 A1 | 11/2018 |
| WO | 2019010702 A1 | 1/2019 |

OTHER PUBLICATIONS

W. Dong et al., "iDEAL: Incentivized Dynamic Cellular Offloading via Auctions," in IEEE/ACM Transactions on Networking, vol. 22, No. 4, pp. 1271-1284, Aug. 2014, doi: 10.1109/TNET.2013. 2273766. Website: https://ieeexplore.ieee.org/abstract/document/6582689 (Year: 2014).*

(Continued)

*Primary Examiner* — John B Walsh
*Assistant Examiner* — Hassan A Khan
(74) *Attorney, Agent, or Firm* — Ballard Spahr LLP

(57) ABSTRACT

This disclosure includes a method, alone or in combination with other methods or steps described herein. The method may include determining a location pattern associated with a user device connected to a first network operator, such as a mobile network operator (MNO). The location pattern may be indicative of a plurality of presences of the user device within a second network, such as a network of a multiple system operator (MSO). The user device may be configured to store a first subscriber identifier of the MSO and a second subscriber identifier of the MNO. The method may include (Continued)

sending, based on the location pattern, a request to activate the user device on the network of the MSO according to the first subscriber identifier and a first identifier key.

20 Claims, 6 Drawing Sheets

(56) References Cited

U.S. PATENT DOCUMENTS

| | | | | |
|---|---|---|---|---|
| 2006/0153135 | A1* | 7/2006 | Ascolese | H04W 48/18 455/436 |
| 2012/0287781 | A1* | 11/2012 | Maria | H04W 92/02 370/229 |
| 2013/0065557 | A1* | 3/2013 | Zhang | H04W 12/04 455/411 |
| 2014/0141763 | A1* | 5/2014 | Suh | H04L 41/0806 455/418 |
| 2015/0138962 | A1* | 5/2015 | Tipton | H04W 24/02 370/230 |
| 2015/0312383 | A1* | 10/2015 | Roeland | H04L 69/14 370/331 |
| 2018/0278545 | A1* | 9/2018 | Andreoli-Fang | H04L 67/141 |
| 2019/0007826 | A1* | 1/2019 | Wane | H04M 15/8038 |
| 2019/0058798 | A1* | 2/2019 | Lentz | H04W 4/24 |
| 2019/0098488 | A1* | 3/2019 | Syed | H04L 67/306 |
| 2019/0306068 | A1* | 10/2019 | Kiss | H04W 36/0022 |
| 2020/0236149 | A1* | 7/2020 | Mufti | H04L 65/1045 |
| 2020/0314629 | A1* | 10/2020 | Kreishan | H04W 64/003 |
| 2020/0367306 | A1* | 11/2020 | Wang | H04L 63/0884 |
| 2020/0413466 | A1* | 12/2020 | Yu | H04W 76/16 |
| 2021/0195408 | A1* | 6/2021 | Yang | H04W 48/14 |
| 2021/0274339 | A1* | 9/2021 | Sevindik | H04W 60/00 |
| 2022/0110177 | A1* | 4/2022 | Choksi | H04W 76/16 |
| 2022/0167221 | A1* | 5/2022 | Lee | H04W 36/00837 |
| 2022/0232366 | A1* | 7/2022 | Seo | H04W 12/35 |
| 2022/0417841 | A1* | 12/2022 | Chak | H04W 48/18 |
| 2023/0012793 | A1* | 1/2023 | Chak | G06F 3/0481 |
| 2023/0095401 | A1* | 3/2023 | Sivanesan | H04W 36/0058 370/332 |
| 2023/0269556 | A1* | 8/2023 | Li | H04W 24/10 370/329 |

OTHER PUBLICATIONS

U.S. Appl. No. 17/497,825 (2023/0112305), filed Oct. 8, 2021 (Apr. 13, 2023), Samian Kaur (Comcast Cable Communications, LLC).

U.S. Appl. No. 18/194,912 (2023/0319675), filed Apr. 3, 2023 (Oct. 5, 2023), Samian Kaur (Comcast Cable Communications, LLC).

U.S. Appl. No. 18/298,767 (2023/0328620), filed Apr. 11, 2023 (Oct. 12, 2023), Ana Lucia Pinheiro (Comcast Cable Communications, LLC).

U.S. Appl. No. 18/193,400 (2023/0319684), filed Mar. 30, 2023 (Oct. 5, 2023), Ana Lucia Pinheiro (Comcast Cable Communications, LLC).

U.S. Appl. No. 18/093,686, filed Jan. 5, 2023, Robert Jaksa (Comcast Cable Communicaitons, LLC).

Bonaventure et al., "O-RTT TCP Convert Protocol; rfc8803.txt," 0-RTT TCP Convert Protocol; RFC8803.txt, Internet Engineering Task Force, IETF; 2020, https://tools.ietf.org/html/rfc8803.

ETSI TS 123 501 V15.2.0 Release 15, 3GPP TS 23.501, "Systems Architecture for the 5G System," 2018.

ETSI TS 123 502 V15.2.0 Release 15, 3GPP TS 23.502, "Procedures for the 5G System," 2018.

Ford, A. et al. "TCP Extensions for Multipath Operation with Multiple Addresses," Internet Engineering Task Force (IETF), 2013.

3rd Generation Partnership Project; Technical Specification Group Core Network and Terminals; 5G System; Access Traffic Steering, Switching and Splitting (ATSSS); Stage 3, 2021, Release 17.

* cited by examiner

METHODS, APPARATUSES, AND SYSTEMS FOR NETWORK ACCESSIBILITY

BACKGROUND

Network operators provide access to networks, such as the Internet. Some network operators may provide multiple types of services for access. For example, a first network operator, such as multiple service operator (MSO) may provide access through both Wi-Fi (e.g., IEEE 802.11 based protocols) access points and cellular nodes (e.g., 3GPP 5G Node B). A second network operator, such as a mobile network operator (MNO) may provide access to networks and the Internet through cellular nodes. User equipment (e.g., a user device) may be configured with a subscriber identity module and other technology to connect with networks. The establishment of connections between user equipment and networks can task the user equipment and network hardware by increasing demand on limited bandwidth resources and expending energy. This disclosure addresses these and other shortcomings.

SUMMARY

The present invention relates to methods, apparatuses, and systems for network accessibility. For a better understanding of the underlying concepts, the following summary provides non-limiting examples.

An MSO or other network operator may provide an offload service for cellular providers by providing, for example, 802.11 protocol access points or another cellular network. In order to connect to the network operator through the access points, cellular network or other components, the network operator may send an embedded subscriber identity module (eSIM) package for installation on the user device, and the MSO may ask the user device for permission before sending eSIM credentials. The MSO may send the eSIM package based on a location pattern of the user device. For example, the user device may be located in a reception area of the MSO during work hours, indicating that the user device is a good candidate for offloading network bandwidth. Numerous other candidacy considerations are disclosed herein. After receiving, or installing, the eSIM, the user device may join the MSO network based on the identifier and key of the eSIM.

BRIEF DESCRIPTION OF THE DRAWINGS

In order to provide understanding techniques described, the figures provide non-limiting examples in accordance with one or more implementations of the present disclosure, in which.

DETAILED DESCRIPTION

Figure 1:
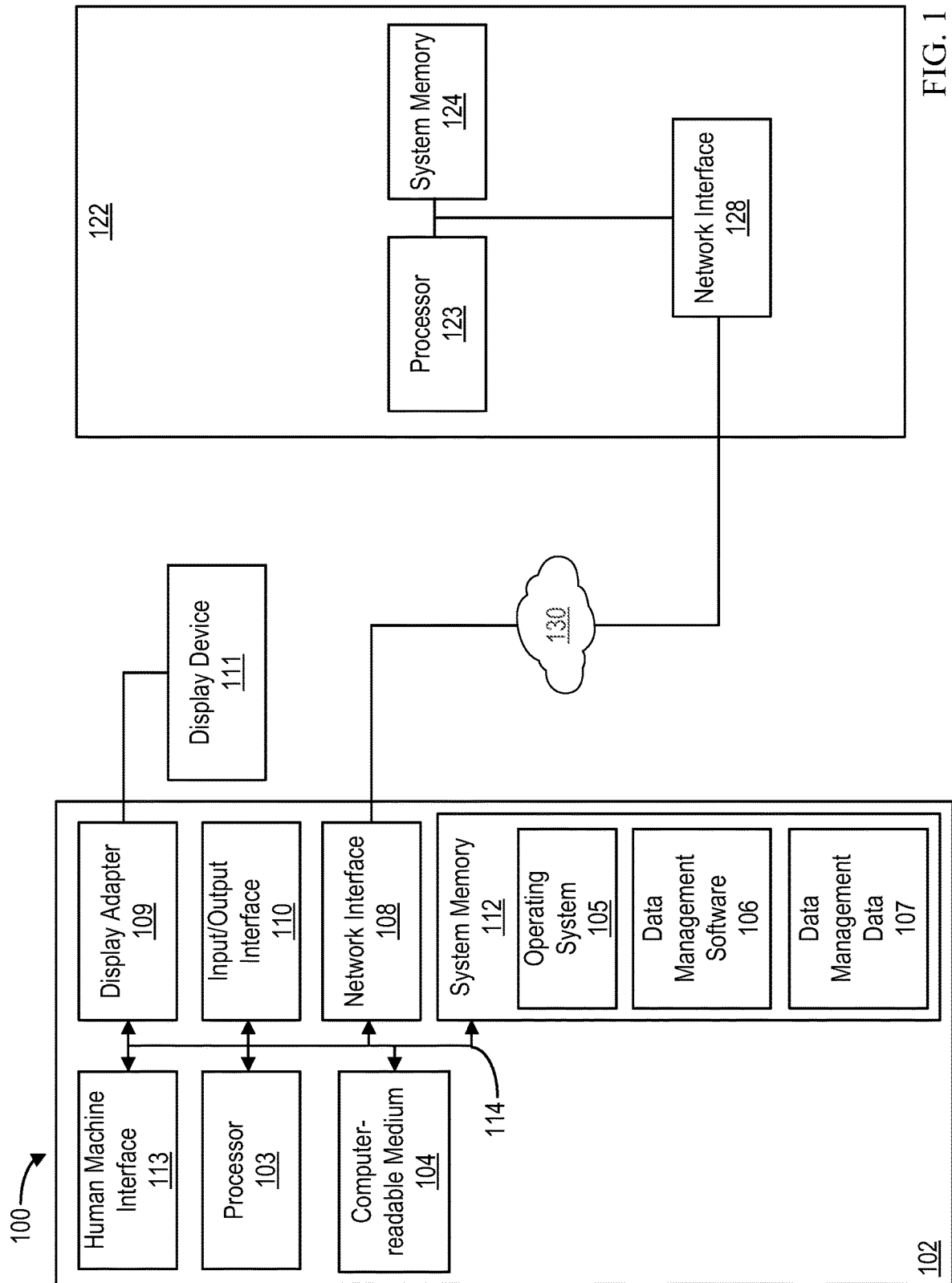
FIG. 1 illustrates an example system in accordance with one or more implementations of the present disclosure.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text, numbers, and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a special purpose computer or other programmable data processing instrument to produce a machine, such that the processor-executable instructions which execute on the computer or other programmable data processing instrument create a device for implementing the functions specified in the flowchart block or blocks.

These processor-executable instructions may also be stored in a computer-readable memory or a computer-readable medium that may direct a computer or other programmable data processing instrument to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing instrument to cause a series of operational steps to be performed on the computer or other programmable instrument to produce a computer-implemented process such that the processor-executable instructions that execute on the computer or other programmable instrument provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

The method steps recited throughout this disclosure may be combined, omitted, rearranged, or otherwise reorganized with any of the figures presented herein and are not intend to be limited to the four corners of each sheet presented.

The techniques disclosed herein may be implemented on a computing device in a way that improves the efficiency of its operation. As an example, the methods, instructions, and steps disclosed herein may improve the functioning of a computing device.

Mobile virtual network operators (MVNO) can deploy wireless networks and provide access to those networks. An MVNO may have a choice between several networks to transfer data. For example, an MVNO may leverage a primary SIM on a device to connect with a first network and secondary SIM that can be activated to transfer data over a second network. The second network may include access points communicate over 802.11 based protocols.

Installation, activation, or combinations thereof of an eSIM may be a network intensive task. The installation, activation, or combination thereof may be directed based on location and/or network conditions. Installation and activation may be further based on a request sent to the user device. For example, the MVNO may send a request to the user device over the primary network or the secondary network to determine whether the user device would like to establish communications over the second network.

FIG. 1 shows a system 100 in accordance with one or more applications of the present disclosure. The user device 102 may comprise one or more processors 103, a system memory 112, and a bus 114 that couples various components of the user device 102 including the one or more processors 103 to the system memory 112. In the case of multiple processors 103, the user device 102 may utilize parallel computing.

The bus 114 may comprise one or more of several possible types of bus structures, such as a memory bus, memory controller, a peripheral bus, an accelerated graphics port, and a processor or local bus using any of a variety of bus architectures.

The user device 102 may operate on and/or comprise a variety of user device readable media (e.g., non-transitory). User device readable media may be any available media that is accessible by the user device 102 and comprises, non-transitory, volatile and/or non-volatile media, removable and non-removable media. The system memory 112 has user device readable media in the form of volatile memory, such as random access memory (RAM), and/or non-volatile memory, such as read only memory (ROM). The system memory 112 may store data such as data 107 and/or programs such as operating system 105 and software 106 that are accessible to and/or are operated on by the one or more processors 103.

The user device 102 may also comprise other removable/non-removable, volatile/non-volatile user device storage media. The computer-readable medium 104 may provide non-volatile storage of user device code, user device readable instructions, data structures, programs, and other data for the user device 102. The computer-readable medium 104 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of programs may be stored on the computer-readable medium 104. An operating system 105 and software 106 may be stored on the computer-readable medium 104. One or more of the operating system 105 and software 106 (e.g., mobile applications), or some combination thereof, may comprise program and the software 106. Data 107 may also be stored on the computer-readable medium 104. Data 107 may be stored in any of one or more databases known in the art. The databases may be centralized or distributed across multiple locations within the network 130.

A user may enter commands and information into the user device 102 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 103 via a human machine interface 113 that is coupled to the bus 114, but may be connected by other interface and bus structures, such as a parallel port, game port, an IEEE 1394 Port (also known as a Firewire port), a serial port, network interface 108, and/or a universal serial bus (USB).

A display device 111 may also be connected to the bus 114 via an interface, such as a display adapter 109. It is contemplated that the user device 102 may have more than one display adapter 109 and the user device 102 may have more than one display device 111. A display device 111 may be a monitor, an LCD (Liquid Crystal Display), light emitting diode (LED) display, television, smart lens, smart glass, and/or a projector. In addition to the display device 111, other output peripheral devices may comprise components such as speakers (not shown) and a printer (not shown) which may be connected to the user device 102 via Input/Output Interface 110. Any step and/or result of the methods may be output (or caused to be output) in any form to an output device. Such output may be any form of visual representation, including, but not limited to, textual, graphical, animation, audio, tactile, and the like. The display 111 and user device 102 may be part of one device, or separate devices.

The user device 102 may operate in a networked environment using logical connections to one or more computing devices 122. A computing device 122 may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the user device 102 and a computing device 122 may be made via a network 130. Such network connections may be through a network interface 108. A network interface 108 may be implemented in both wired and wireless environments.

Application programs and other executable program components such as the operating system 105 are shown herein as discrete blocks, although it is recognized that such programs and components may reside at various times in different storage components of the user device 102, and are executed by the one or more processors 103 of the user device 102. The computing device 122 may include all of the components described with regard to the user device 102.

The user device 102 may one or more components configured to communicate over electromagnetic waves or other mediums. The user device 102 may be configured with one or more subscriber identity modules (SIM). The SIM may be stored in persistent memory, embedded, physical, or combinations thereof. In such a way, the SIM may form a credential circuit as data stored permanently or otherwise on the user device 102. The user device 102 may be configured for Dual SIM Dual Standby (DSDS) or Dual SIM Dual Active (DSDA). For example, the primary SIM of the DSDS may be a physical SIM (pSIM) and the secondary SIM may be an embedded SIM (eSIM). The SIM may include one or more pairs of unique identifiers and keys. Information may be stored on a particular chip or combinations of chips, the computer-readable medium 104, or otherwise.

The user device 102 is configured to communicate over a network interface 108. The network interface 108 may be configure with a radio or other electromagnetic spectrum transceiver. The network interface 108 may be combined with a SIM, and identification numbers (e.g., international mobile subscriber identity, local area identity) and keys therein (e.g., $k_i$), for secure communications.

The user device 102 may communicate with the computing device 122 over a network 130. Such communication paths may include wired communication technologies, wireless communication technologies, or combinations thereof. Wireless communication technologies may include various 3GPP standards (e.g., LTE, 5G) and Institute of Electrical and Electronics Engineers (IEEE) standards (e.g., 802.11). Wired communication technologies may include various IEEE standards (e.g., 802.3). While various communication technologies and standards are contemplated herein, various communication mediums (e.g., wire, air), standards making bodies (e.g., 3GPP, IETF, IEEE), and protocols are contemplated herein.

Communications protocols contemplated herein may be connectionless or connection-based. For example, Transmission Control Protocol (TCP) may be used to establish a state-based or connection-based communication between a client (e.g., user device 102), a computing device 122, or components, hops, nodes, instances, functions there between, or combinations thereof. A protocol may define header and payload information for packets of information. Headers may define various configurations and settings associated with the transmitted payload.

Figure 2:
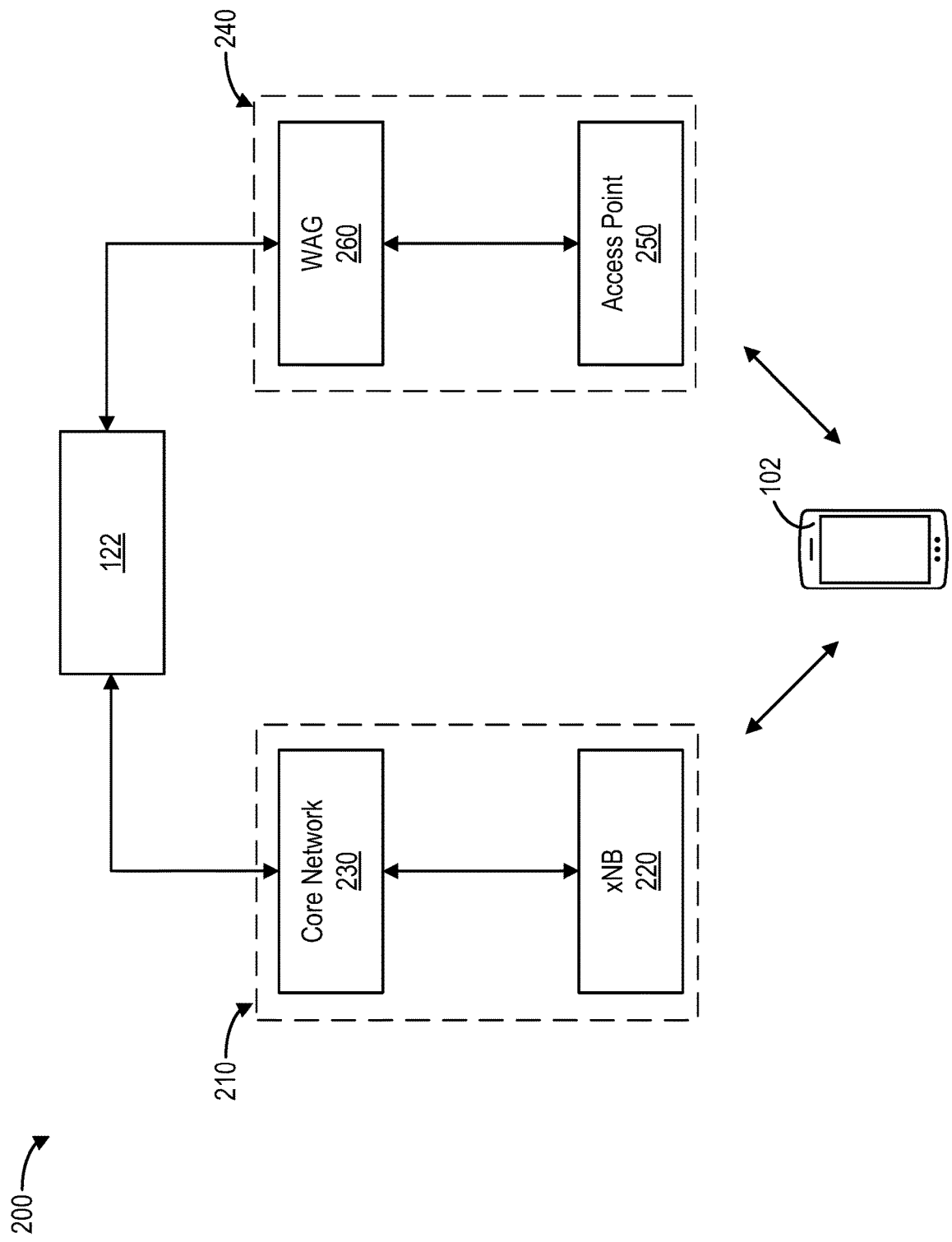
FIG. 2 illustrates an example communication architecture in accordance with one or more implementations of the present disclosure.

Referring to FIG. 2, a network 210 (e.g., a network of an MNO) may include wireless communication protocols between user device 102 and the cellular base station 220 (e.g., eNB, gNB, xNB), which may be part of a radio access network based on various radio access technologies. The radio access network may be associated with a network provider. A network provider (e.g., public land mobile network (PLMN)) may maintain the radio access network and the associated core network 230. The network provider (e.g., an MNO) may issue subscriptions for the user device 102 to access the network 210. The network may include communications hardware and software to support various protocols and components (e.g., 3GPP 5G, IEEE 802.11). The terms MVNO, MSO, PLMN, MNO, and other operator indicators are intended for designation (e.g., first, second, third) to distinguish between different network providers and are not intended to be rigid as terminology and scope of these and other terms is evolving in the field.

Another communication path may be established between user device 102 and computing device 122 over a network 240 (e.g., a network of an MSO) having a WiFi or IEEE 802.11 access point 250. The access point 250 may be configured to communicate with a wireless access gateway 260. The wireless access gateway 260 may route data packets from the access point 250 to the network 130. A network provider (e.g., an MSO) may maintain the access point 250 and the associated wireless access gateway 260. The network provider may issue subscriptions for the user device 102 to access one or more of the networks (e.g., network 210, network 240). The subscriptions may be issued in packages (e.g., subscription packages) and stored or unpacked on a SIM, an embedded SIM, or otherwise. The network provider associated with the access point 250 may be different than the network provider associated with the radio access network.

The core network 230 and wireless access gateway 260 are used as examples for context. It should be appreciated that standards may change the names of these entities as technologies improve and progress. The core network 230 and the wireless access gateway 260 may be configured to directly communicate over an interface. For example, an access and mobility function (AMF) may perform some or all of the steps described herein. The computing device 122 may be configured to perform all or some of the steps described. For example, the computing device 122 may orchestrate SIM provisioning based on a location pattern, a quantity of time, data consumption, or combinations thereof according to the user device 102. The computing device 122 may be configured to send a request to the user device 102 to determine whether the user device 102 is interested in connecting over the MSO network with eSIM credentials. The computing device 122 may be or may be connected with a remote SIM provisioning system (SM-DP+). The user device 102 may connect with the computing device 122, through the computing device 122, or according to the computing device 122 to obtain the eSIM or eUICC.

The computing device 122 may be associated with either the network 210 or the network 240. The computing device 122 may be independent of the network 210 and the network 240. For example, the computing device 122 may serve as an intermediary, receiving data from the user device 102 over either of the networks 210, 240 or another network and providing a provisioning of the identifier and key. The identifier and the key may be pushed or pulled.

Figure 3:
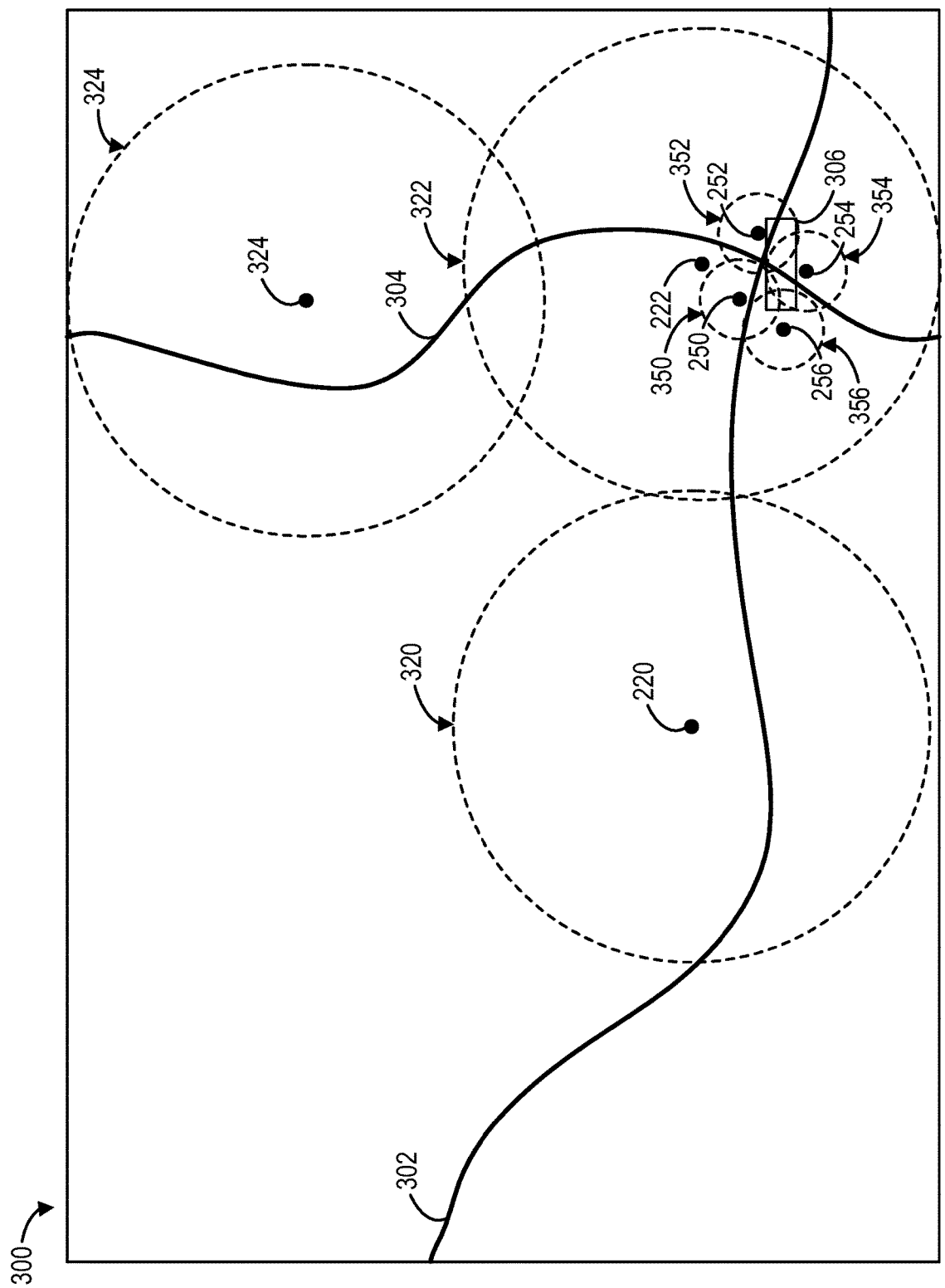
FIG. 3 illustrates example areas of reception associated with network operators in accordance with one or more implementations of the present disclosure.

Referring to FIG. 3, example areas of reception 350, 352, 354, 356, 320, 322, 324 associated with networks 210, 240 in accordance with one or more implementations of the present disclosure. As shown on map 300, the areas of reception 350, 352, 354, 356, 320, 322, 324 may provide reception to the user device 102 along roads 302, 304 or other features. An intersection of the roads 302, 304 may be indicative of a city or another feature. For example, a network 240 may include areas of reception 350, 352, 354, 356, providing service to offload data transfers from the network 210 associated with areas of reception 320, 322, 324. Although shown as circular, the areas of reception 350, 352, 354, 356, 320, 322, 324 may be any shape (e.g., ovoid, conical). The areas of reception 350, 352, 354, 356 may form a general area of reception associated with the network 240, and the areas of reception 320, 322, 324 may form a general area of reception associated with the network 210. The areas of reception 350, 352, 354, 356 may be formed by signals propagated by access points 250, 252, 254, 256, and the areas of reception 320, 322, 324 may be formed by signals propagated by nodes 220, 222, 224.

A geofence 306 is also depicted. The geofence 306 may be based on a geographical location (e.g., college campus, city center). The geofence 306 may be based on a building defined by three-dimensional coordinates of the building or portions thereof (e.g., floor).

Figure 4:
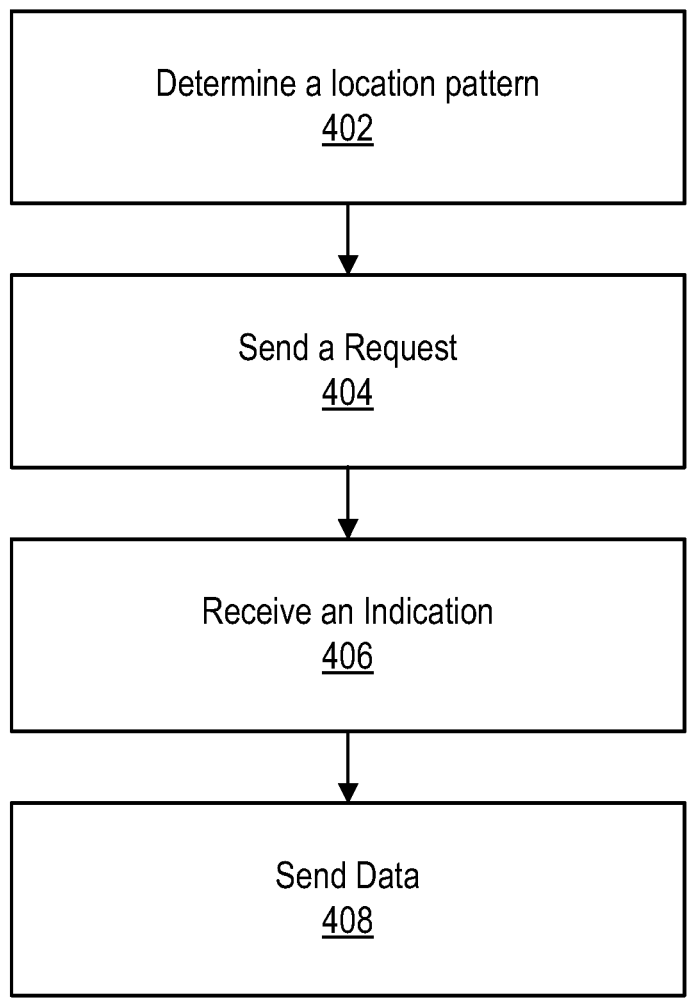
FIG. 4 illustrates an example method in accordance with one or more implementations of the present disclosure.

In FIG. 4, an example method 400 in accordance with one or more implementations of the present disclosure is shown. Any of the components or devices (e.g., user device 102, computing device 122) or portions thereof may implement one or more of the steps in any of the methods described herein. In step 402, a location pattern may be determined. For example, a location pattern may be a representation of location of the user device 102 over time. For instance, the pattern may include the time spent within a location (e.g., an area of reception) or the data used within the location (e.g., an area of reception). The pattern may relate to various signals based on the network, the user device 102, or otherwise. Signals may relate to time, activity levels, direction of movement, geofences, transiency, data consumption, data types, data latency tolerance, previous connections to MSO networks, user input, data propensity, coordinates of location, building or street addresses associated with locations, subscription types, or combinations thereof. These signals may be indicative, individually or in the aggregate, that the user device 102 is a viable candidate to connect with one of the networks 210, 240.

For example, the pattern determination may be related to time within an area of reception, a geofence, or combinations thereof. The area of reception and geofence may be independently or collectively based on the MNO network or the MSO network. For example, the area of reception may be based on only the MNO network and radio area network, the MSO network and access points, or combinations thereof.

The activity level, for example, may relate to interaction by a user with the user device 102. The activity level may be based on the screen time the user device 102 is actively displaying or interacting with a user. The activity level may be based on the clicks or touches per minute or another statistical analysis of user activity. The activity level may be related to the direction of movement of the user device 102. For example, if the user device 102 is traveling toward the area of reception of the MSO network or another network, the signal may be indicative of viability of connection.

The pattern may be based on the transiency of the user device 102. For example, traveling through the area of reception along one of the roads 302, 304 may indicate that the user device 102 is transient. The user device 102 may occasionally pass through the area of receptions 350, 352, 354, 356, indicating that the user device 102 is transient. A threshold may be satisfied to indicate transiency. For example, the threshold may relate to the average time spent within the area of receptions 350, 352, 354, 356.

The pattern may be based on data consumption, data types, data latency tolerance, or combinations thereof. For example, the amount of data statistically consumed may be used to determine whether the user device 102 is a viable candidate for connection. A data consumption threshold may be satisfied as indicative that the user device 102 should be allowed to join the network. Types of data historically used by the user device 102 may indicate viable candidates. For example, the consumption of low latency data or data that does not require quick response times (e.g., multimedia) may indicate that the user device 102 is a viable candidate. A data latency threshold may be satisfied to indicate that, on average or otherwise, the user device 102 uses data that categorically would allow connection.

The location pattern may be indicative of presences of the user device 102 within the area of reception or network of the MSO. For example, the location pattern may be based on the quantity of presences of the user device 102 within the network.

Historical connections of the user device 102 may be used to determine the pattern. For example, previous connections to MSO networks may be indicative of a viable connection candidate. Further, historical attributes of user input, data consumption propensity, or combinations thereof may provide the signals used to determine the location pattern. Further, coordinates of location (e.g., building or street addresses associated with locations, x-y-z coordinates) may be used to determine the pattern. The user device 102 may be associated with subscription types for the MNO and MSO network (e.g., unlimited data, limited data), which may be used to determine the pattern. The pattern may be further received from another server or the user device 102. The computing device 122 may also determine the pattern.

In step 404, a request may be sent. For example, the computing device 122 may send the request to the user device 102. The request may be based on the location pattern. For example, the request may be sent based on an algorithmic determination that the location pattern is a viable candidate for connection to the network 240. The request may be configured to request user interaction with the user device 102. For example, the request may cause the user device 102 to display a notification or prompt indicative of the request. The user may interact with the notification or prompt to acknowledge or authorize activation of the user device 102 on the network 240 associated with the MSO. The user device 102 may send a response without user interaction. For example, the user device 102 may determine, based on the location pattern, other information stored on the user device 102, or a combination thereof, that the user device 102 should connect with the network 240 of the MSO. The user device 102 may make this determination based on the request.

The request may be sent over the network 240 of the MSO, the network 210 of the MNO, or a combination thereof. For example, the user device 102 may be already connected to the network 210 of the MNO. The computing device 122 may be configured to send data to the user device 102 over the network 210 of the MNO. The computing device 122 may be configured to send data to the user device 102 during a handshake process over the network 240 of the MSO before authenticated connection. Encryption keys may be exchanged or preshared with the user device 102 to enable encrypted communications. For example, the user device 102 may include software (e.g., an application from an application store) that includes preshared keys or a mechanism for receiving the request from the computing device 122 over the network 240 of the MSO.

In step 406, an indication may be received. For example, the computing device 122 may receive an indication that the user device 102 would like to connect to the network 240 of the MSO. The indication may be based on the request. The indication may include data associated with the request (e.g., an identifier or sequence number).

In step 408, data indicative of a subscriber identifier and an identifier key may be sent. The subscriber identifier and the identifier key may be credentials associated with the network 240 of the MSO. For example, the data may be a package including encrypted, compressed, or otherwise data indicative of the subscriber identifier and the identifier key associated with access for a subscriber associated with the user device 102 for connected to the network 240 of the MSO. The data may include a packet comprising the first subscriber identifier and the first identifier key in plain text. The data may include a packet comprising the first subscriber identifier and the first identifier key in encrypted text.

After receiving the package, eSIM, or otherwise, the user device 102 may connect to the network 240 of the MSO. The connection may be based on the subscriber identifier and the identifier key associated with the network 240 of the MSO.

Figure 5:
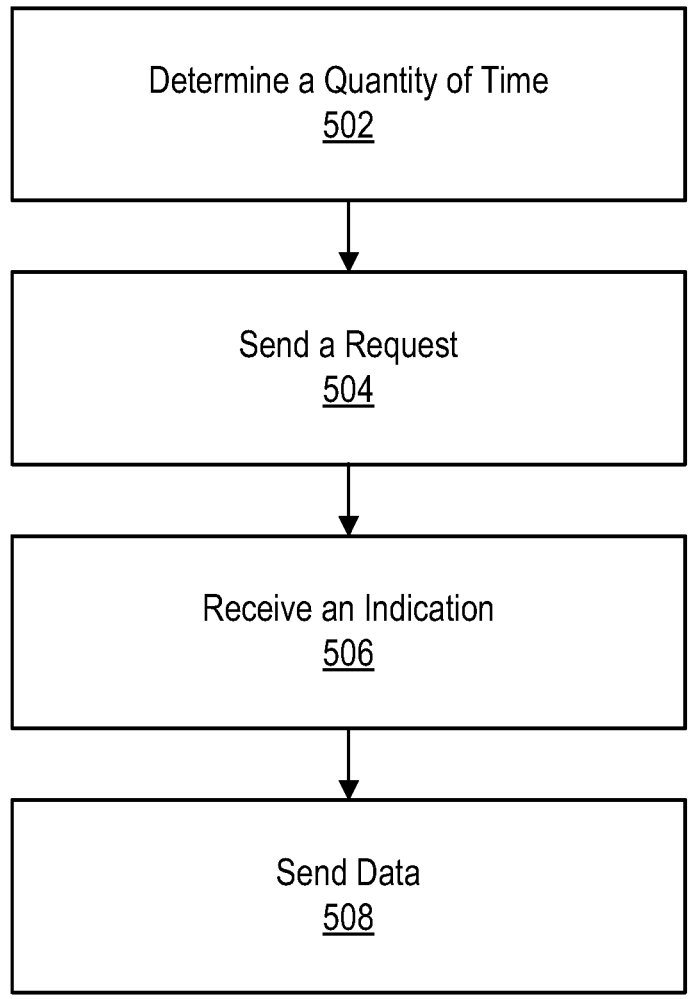
FIG. 5 illustrates an example method in accordance with one or more implementations of the present disclosure.

In FIG. 5, an example method 500 in accordance with one or more implementations of the present disclosure is shown. Any of the components or devices (e.g., user device 102, computing device 122) or portions thereof may implement one or more of the steps in any of the methods described herein. In step 502, a quantity of time the user device 102 is within one or more of the areas of reception 320, 322, 324, 350, 352, 354, 356 may be determined. A consumption of data by the user device 102 may also be determined. The consumption of data may be based on the network 210 of the MNO or the network 240 of the MSO. If the quantity of time and the consumption of data satisfy a threshold (e.g., predetermined threshold), a request may be sent in step 504.

The quantity of time may be based on a representation of location of the user device 102 over time. For instance, the quantity of time may include the time spent within a location (e.g., an area of reception) or the quantity of time data is consumed at the location (e.g., an area of reception). The quantity of time may be based on various signals related to the networks 210, 240, the user device 102, or otherwise. Signals may relate to time, activity levels, direction of movement, geofences, transiency, data consumption, data types, data latency tolerance, previous connections to MSO networks, user input, data propensity, coordinates of location, building or street addresses associated with locations, subscription types, or combinations thereof. These signals may be indicative, individually or in the aggregate, that the user device 102 is a viable candidate to connect with one of the networks 210, 240 as otherwise described herein.

For example, the quantity of time determination may be related time within an area of reception, a geofence, or combinations thereof. The area of reception and geofence may be independently or collectively based on the MNO network or the MSO network. For example, the area of reception may be based on only the MNO network and radio area network, the MSO network and access points, or combinations thereof.

The quantity of time may be based on an activity level, for example, and may relate to interaction by a user with the user device 102. The activity level may be based on the screen time the user device 102 is actively displaying or interacting with a user. The activity level may be based on the clicks or touches per minute or another statistical analysis of user activity. The activity level may be related to the direction of movement of the user device 102. For example, if the user device 102 is traveling toward the area of reception of the MSO network or another network, the signal may be indicative of viability of connection.

The quantity of time may be based on the transiency of the user device 102. For example, traveling through the area of reception along one of the roads 302, 304 may indicate that the user device 102 is transient. The user device 102 may occasionally pass through the area of receptions 350, 352, 354, 356, indicating that the user device 102 is transient. A threshold may be satisfied to indicate transiency. For example, the threshold may relate to the average time spent within the area of receptions 350, 352, 354, 356.

The data consumption may further be based on data types, data latency tolerance, or combinations thereof. For example, the amount of data statistically consumed may be used to determine whether the user device 102 is a viable candidate for connection. A data consumption threshold may be satisfied as indicative that the user device 102 should be allowed to join the network. Types of data historically used by the user device 102 may indicate viable candidates. For example, the consumption of low latency data or data that does not require quick response times (e.g., multimedia) may indicate that the user device 102 is a viable candidate. A data latency threshold may be satisfied to indicate that, on average or otherwise, the user device 102 uses data that categorically would allow connection.

Further, coordinates of location (e.g., building or street addresses associated with locations, x-y-z coordinates) may be used to determine the quantity of time. The user device 102 may be associated with subscription types for the MNO and MSO network (e.g., unlimited data, limited data), which may be used to determine the quantity of time or the threshold. The quantity of time may be further received from another server or the user device 102. The computing device 122 may also determine the quantity of time.

In step 504, a request may be sent. For example, the computing device 122 may send the request to the user device 102. The request may be based on the satisfaction of the quantity of time, the consumption of data, or combinations thereof (e.g., 30 minutes within the area of reception with five gigabytes of multimedia data received). For example, the request may be sent based on an algorithmic determination that the quantity of time and the consumption of data indicate that the user device 102 is viable candidate for connection to the network 240. The request may be configured to request user interaction with the user device 102. For example, the request may cause the user device 102 to display a notification or prompt indicative of the request. The user may interact with the notification or prompt to acknowledge or authorize activation of the user device 102 on the network 240 associated with the MSO. The user device 102 may send a response without user interaction. For example, the user device 102 may determine, based on the quantity of time, the consumption of data, other information stored on the user device 102, or a combination thereof, that the user device 102 should connect with the network 240 of the MSO. The user device 102 may make this determination based on the request.

The request may be sent over the network 240 of the MSO, the network 210 of the MNO, or a combination thereof. For example, the user device 102 may be already connected to the network 210 of the MNO. The computing device 122 may be configured to send data to the user device 102 over the network 210 of the MNO. The computing device 122 may be configured to send data to the user device 102 during a handshake process over the network 240 of the MSO before authenticated connection. Encryption keys may be exchanged or preshared with the user device 102 to enable encrypted communications. For example, the user device 102 may include software 106 (e.g., an application from an application store) that includes preshared keys or a mechanism for receiving the request from the computing device 122 over the network 240 of the MSO.

In step 506, an indication may be received. For example, the computing device 122 may receive an indication that the user device 102 would like to connect to the network 240 of the MSO. The indication may be based on the request. The indication may include data associated with the request (e.g., an identifier or sequence number).

In step 508, data indicative of a subscriber identifier and an identifier key may be sent. The subscriber identifier and the identifier key may be credentials associated with the network 240 of the MSO. For example, the data may be a package including encrypted, compressed, or otherwise data indicative of the subscriber identifier and the identifier key associated with access for a subscriber associated with the user device 102 for connected to the network 240 of the MSO. The data may include a packet comprising the first subscriber identifier and the first identifier key in plain text. The data may include a packet comprising the first subscriber identifier and the first identifier key in encrypted text.

After receiving the package, eSIM, or otherwise, the user device 102 may connect to the network 240 of the MSO. The connection may be based on the subscriber identifier and the identifier key associated with the network 240 of the MSO.

Figure 6:
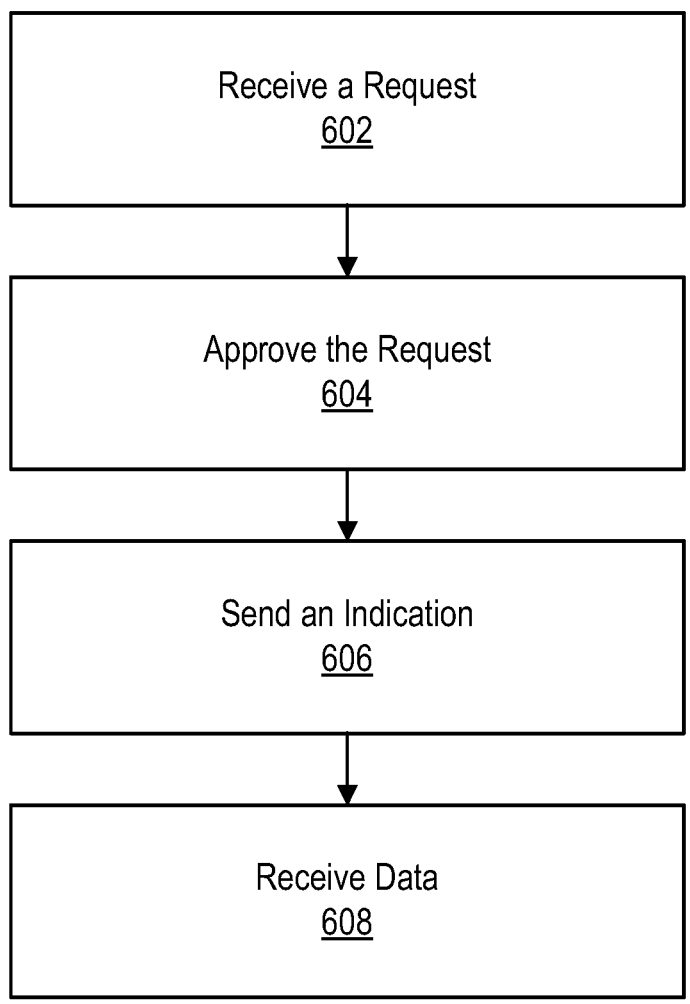
FIG. 6 illustrates an example method in accordance with one or more implementations of the present disclosure.

In FIG. 6, an example method in accordance with one or more implementations of the present disclosure. Any of the components or devices (e.g., user device 102, computing device 122) or portions thereof may implement one or more of the steps in any of the methods described herein. In step 602, a request may be received. For example, the computing device 122 may send the request to the user device 102. The request may be based on the location pattern, the quantity of time, the consumption of data or otherwise. For example, the request may be sent based on an algorithmic determination that the quantity of time and the consumption of data indicate that the user device 102 is viable candidate for connection to the network 240. The request may be configured to request user interaction with the user device 102.

In step 604, the request may cause the user device 102 to display a notification or prompt indicative of the request for approval. The user may interact with the notification or prompt to acknowledge, authorize, or approve activation of the user device 102 on the network 240 associated with the MSO. The user device 102 may send a response without user interaction. For example, the user device 102 may determine, based on the quantity of time, the consumption of data, other information stored on the user device 102, or a combination thereof, that the user device 102 should connect with the network 240 of the MSO. The user device 102 may make this determination based on the request.

In step 606, an indication may be sent. For example, the user device 102 may send the indication to the computing device 122. The indication may be based on the request. The indication may be based on the approval. The indication may include data associated with the request (e.g., an identifier or sequence number).

In step 608, data indicative of a subscriber identifier and an identifier key may be received. The subscriber identifier and the identifier key may be credentials associated with the network 240 of the MSO. For example, the data may be a package including encrypted, compressed, or otherwise data indicative of the subscriber identifier and the identifier key associated with access for a subscriber associated with the user device 102 for connected to the network 240 of the MSO. The data may include a packet comprising the first subscriber identifier and the first identifier key in plain text. The data may include a packet comprising the first subscriber identifier and the first identifier key in encrypted text. The packaged may be unpacked and installed. The installation may store the identifier or key on a SIM or associated with a SIM. The installation may embed the identifier or key on the SIM.

The network functions described here in may be generally referred to as a generic combination function that may run on one or more servers, one or more instances, one or more sets of instructions, and so on. Such instances may be containerized, replicated, scaled, and distributed by network 210, 240 to meet the growing demands of respective networks. Any of the steps or functions described in one or more of the methods, architectures, or call flows described herein may be used in conjunction with any of the other methods, architectures, or call flows described herein. Any of the components (e.g., network functions, user equipment, servers) may perform any of the steps from any of the methods or call flows described herein even though not specifically described and may be performed in combination with any of the other components. It should be appreciated that the techniques described herein relate to various protocols and technology and may at least apply to 3G, LTE, and 5G technologies.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining a location pattern of a user device connected to a network of a first network operator wherein the location pattern of the user device is indicative of a plurality of presences of the user device within a network of a second network operator, wherein the user device is configured to store a first subscriber identifier of the second network operator and a second subscriber identifier of the first network operator;
   sending, based on the location pattern of the user device, a request to activate the user device on the network of the second network operator according to the first subscriber identifier and a first identifier key;
   receiving, based on the request, an indication to connect the user device to the network of the second network operator; and
   sending, based on the indication, data indicative of the first subscriber identifier and the first identifier key.

2. The method of claim 1, further comprising:
   connecting, based on the first subscriber identifier and the first identifier key, the user device to a service associated with the network of the second network operator.

3. The method of claim 1, wherein the user device comprises a subscriber identification module.

4. The method of claim 1, wherein the request is configured to cause a prompt to display on the user device.

5. The method of claim 4, further comprising:
   receiving, based on the request, an indication to connect the user device to the network of the second network operator, wherein the indication is based on the prompt displayed on the user device.

6. The method of claim 1, wherein the determining the location pattern is based on a geofence.

7. The method of claim 6, wherein the geofence is based on a coordinate system.

8. The method of claim 7, wherein the geofence is a college campus, a metropolitan area, or a floor of a building.

9. The method of claim 1, wherein the sending the request is further based on consumption of data associated with the user device.

10. The method of claim 9, wherein the consumption of data is based on a geofence.

11. The method of claim 9, wherein the consumption of data is related to a categorical classification of the consumption of data.

12. The method of claim 1, wherein the sending the request is further based on an address of a customer associated with the user device.

13. The method of claim 1, wherein the sending the request is further based on a subscription type of the user device on the network of the second network operator.

14. The method of claim 13, wherein the subscription type is unlimited data.

15. A method comprising:
   determining, based on a first subscriber identifier and a first identifier key, that a quantity of time a user device is within an area of reception of a network of a first network operator while consuming data on a network of a second network operator satisfies a time threshold, wherein the user device is configured to store a plurality of subscriber identifiers of a plurality of network operators; and
   sending, based on the satisfaction of the time threshold and based on a location pattern of the user device, a second subscriber identifier and a second identifier key associated with the second network operator to connect the user device to the network of the second network operator.

16. The method of claim 15, further comprising:
   connecting, based on the first subscriber identifier and the first identifier key, the user device to a service associated with the network of the second network operator.

17. The method of claim 15, wherein the user device comprises a subscriber identification module.

18. The method of claim 15, wherein the request is configured to cause a prompt to display on the user device.

19. The method of claim 15, wherein the indication is based on a prompt displayed on the user device.

20. A method comprising:
   receiving, based on a location pattern of a user device connected to a network of a second network operator, a request to activate the user device on a network of a first network operator according to a first subscriber identifier and a first identifier key, wherein the location pattern of the user device is indicative of a plurality of presences of the user device within the network of the first network operator, wherein the user device is configured to store a first subscriber identifier of the first network operator and a second subscriber identifier of the second network operator;
   approving, based on a selection, the request;
   sending, based on the selection, an indication to connect the user device to the network of the first network operator; and
   receiving, based on the indication, data indicative of the first subscriber identifier and the first identifier key.

* * * * *